(12) United States Patent
Fletcher (10) Patent No.: US 7,111,781 B2
(45) Date of Patent: Sep. 26, 2006

(54) SYSTEM AND METHOD FOR LIBRARY INVENTORY

(75) Inventor: Dean H. Fletcher, Mission Viejo, CA (US)

(73) Assignee: Quantum Corporation, San Jose, CA (US)

( * ) Notice: Subject to any disclaimer, the term of this patent is extended or adjusted under 35 U.S.C. 154(b) by 119 days.

(21) Appl. No.: 10/676,591

(22) Filed: Sep. 30, 2003

(65) Prior Publication Data

US 2005/0067490 A1 Mar. 31, 2005

Related U.S. Application Data

(60) Provisional application No. 60/507,470, filed on Sep. 29, 2003.

(51) Int. Cl.
*G06F 19/00* (2006.01)

(52) U.S. Cl. .................. 235/385; 235/383; 235/486; 235/462.25

(58) Field of Classification Search ............... 235/486, 235/385, 462.14
See application file for complete search history.

(56) References Cited

U.S. PATENT DOCUMENTS

| | | | |
|---|---|---|---|
| 4,908,777 A | 3/1990 | Wolfe | |
| 5,237,468 A | 8/1993 | Ellis | |
| 5,303,034 A | 4/1994 | Carmichael et al. | |
| 5,321,353 A | 6/1994 | Furness | |
| 5,426,581 A | 6/1995 | Kishi et al. | |
| 5,429,470 A | 7/1995 | Nicol et al. | |
| 5,661,287 A | 8/1997 | Schaefer et al. | |
| 5,814,171 A | 9/1998 | Manes et al. | |
| 5,925,119 A | 7/1999 | Maroney | |
| 5,959,425 A | 9/1999 | Bieman et al. | |
| 6,101,455 A | 8/2000 | Davis | |
| 6,213,705 B1 | 4/2001 | Wilson | |
| 6,325,505 B1 | 12/2001 | Walker | |
| 6,347,742 B1* | 2/2002 | Winarski et al. | 235/462.35 |
| 6,374,145 B1* | 4/2002 | Lignoul | 700/17 |
| 6,438,448 B1 | 8/2002 | Manes et al. | |
| 6,574,529 B1 | 6/2003 | Lundeen et al. | |
| 2002/0177924 A1 | 11/2002 | Manes et al. | |
| 2003/0053715 A1 | 3/2003 | Chamberlain | |

FOREIGN PATENT DOCUMENTS

| | | | |
|---|---|---|---|
| JP | 63-37486 A | 2/1988 | |
| JP | 9-91930 A | 4/1997 | |

OTHER PUBLICATIONS

European Search Report mailed Apr. 6, 2006 for European Patent Application No. 04255879.1, three pages.

* cited by examiner

*Primary Examiner*—Seung H Lee
(74) *Attorney, Agent, or Firm*—Morrison & Foerster LLP (57) ABSTRACT

A storage device detector system for use with a gripper assembly for handling storage devices in a storage library system is provided. In one example, the system includes a light source for directing light to an expected position of a storage device, a sensor, e.g., a linear scanner, for detecting light, and a controller, wherein the controller and the sensor are adapted to detect the light directed to the expected position of the storage device and determine the presence of the storage device based on frequency components from the sensor. If the frequency is above a predetermined value the system may determine that a storage device is present and if below the predetermined value determine that a storage device is not present.

29 Claims, 8 Drawing Sheets

SYSTEM AND METHOD FOR LIBRARY INVENTORY

CROSS-REFERENCE TO RELATED APPLICATIONS

The present application claims benefit of earlier filed provisional application U.S. Ser. No. 60/507,470 entitled "SYSTEM AND METHOD FOR LIBRARY INVENTORY," filed on Sep. 29, 2003, which is incorporated herein in its entirety by reference as if fully set forth herein.

BACKGROUND OF THE INVENTION

1. Field of the Invention

The present invention relates generally to automated storage libraries for storing and retrieving computer data, and more particularly to systems and methods for detecting and handling storage devices with an automated gripper and integrated camera in automated storage libraries.

2. Description of the Related Art

A popular device for the handling and storage of large amounts of information in a data processing system includes an automated storage library system. Automated storage library systems generally improve the access speed and reliability of data storage libraries containing large amounts of information. Automated storage library systems typically include a plurality of storage media devices, a transport mechanism, and one or more storage media drives in communication with a computer system or network for inputting and outputting desired information to and from the plurality of storage media devices.

Magnetic tape cartridges, for example, have proven to be an efficient and effective medium for data storage in computer systems and storage libraries. Automated tape cartridge libraries generally have a plurality of storage bins or slots for storing tape cartridges, a robotic picker mechanism (often referred to as a "picker"), and one or more tape drives. The robotic picker may be controlled to select a specific storage tape cartridge from the library and transfer the tape cartridge between a storage slot and a tape drive within seconds. The robotic picker typically includes a gripper or hand mechanism positioned on the robotic picker. The robotic picker may position the gripper near a desired tape cartridge such that the gripper may grip the tape cartridge to remove the tape cartridge from the storage bin and transfer the tape cartridge and load the tape cartridge into a tape drive, load port (for adding or removing tapes from the library), or the like.

An automated storage cartridge library is typically interfaced to a computer system such as a computer network or the like. The storage library or interfaced computer system may index the location of the tape cartridges and their associated stored data within the storage library for later retrieval of the stored information. When desired, the storage library may be activated to retrieve a desired storage tape and load it into a drive to access the stored information and/or write new information. In large storage libraries multiple tape drives are generally employed to improve access and storage performance by operating in parallel as well as providing back-up drives in case of failure, maintenance, and the like.

To quickly locate and retrieve a cartridge from the library an inventory of the storage cartridge tapes located within the storage library system is performed, typically after loading cartridges into the library system. Each cartridge is equipped with a label, such as a barcode label, that may be read by a bar code scanner mechanically coupled to the gripper. The bar code scanner is generally a laser that mechanically scans across the barcode label surface. The bar code label may be used to identify the cartridge, e.g., the contents of stored data (if any) on that particular cartridge.

The ability for the library system to distinguish between unlabeled cartridges and empty storage locations is generally needed so the system may determine an accurate library inventory. One method to achieve this is to place an "empty" barcode label within the storage slot such that when read by a bar code reader it is associated with an empty slot. The "empty" barcode label is blocked from view of the bar code reader when a cartridge is placed within the storage slot. If a barcode label is not detected, however, the system remains uncertain if the storage slot contains a cartridge, e.g., whether the label is missing from the cartridge or the storage slot.

Another typical method for determining if a storage slot is empty includes having the robotically actuated gripper assembly reach into each storage slot and physically sense whether or not a cartridge is present. For example, an actuator current level may be monitored until it rises above a threshold level indicating a cartridge is present. Extending the robotically actuated gripper assembly or other mechanical device into each storage slot for inventory purposes, however, adds significant time to the inventory process and may cause wear or damage to the tape cartridge and/or gripper assembly.

Another method includes an additional sensor (separate from and in addition to a barcode scanner) dedicated to sensing the presence of a cartridge tape in the slot that may be mounted to the gripper assembly in addition to a barcode scanner or the like. Such an example is described in U.S. Pat. No. 6,213,705 and is hereby incorporated by reference in its entirety. An additional sensor on the gripper assembly, however, may add significant cost and complexity to the system as well as time to the inventory process.

Therefore, what is needed is a system and method for reading barcode labels or other indicia associated with storage devices in an automated storage library system with increased speed and reliability. Further, a system and method for sensing the presence (with and without a barcode label) or absence of a storage device within a storage slot of the automated storage library without additional cost and complexity to the system are desired.

BRIEF SUMMARY OF THE INVENTION

In one exemplary embodiment, a storage device detector system for use with a gripper assembly for handling storage devices in a storage library system is provided. The system includes a light source for directing light to an expected position of a storage device, a sensor, e.g., a linear scanner, for detecting light, and a controller, wherein the controller and the sensor are adapted to detect the light directed to the expected position of the storage device and determine the presence of the storage device based on frequency components from the sensor. In one example, if the frequency components or features are above a predetermined value the system determines that a storage device is present, and if the frequency components or features are below the predetermined value the system determines that a storage device is not present. The sensor may also read a barcode label associated with a storage device based on the detected light.

In another exemplary embodiment, a method for determining the presence or absence of a storage device is provided. The method includes directing light to a storage slot for holding a storage device and detecting light reflected from the storage slot with a sensor, e.g., a linear scanner. The method further includes determining if a storage device is located within the storage slot based on a characteristic of the detected light by the sensor, and reading a barcode label based on the light detected by the sensor if a barcode label associated with the storage device is present. In one example, the characteristic of the detected light used to determine the presence of a storage device includes frequency components or features detected by the sensor.

The present invention and its various embodiments are better understood upon consideration of the detailed description below in conjunction with the accompanying drawings and claims.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the scope consistent with the appended claims.

In one example, a sensor is provided including a linear scanner (often referred to as a "line-scan camera") or an area scanner configured to image a linear scan across a storage slot opening and facing side of a storage device if present within the storage slot. The linear scanner may read a barcode label and also determine the presence or absence of a storage device within a storage slot. In particular, a distinction may be made between high and low frequency components or features detected by the linear scanner (or linear scan/portion of an area sensor) to determine the presence or absence of a storage device. For example, the optics may have a depth of focus such that the linear scanner outputs or images generally high frequency components associated with light reflected from an unlabeled storage device near the depth of focus of the sensor, and images generally low frequency components associated with an empty slot having features and objects near the back of the storage slot and out of focus. Thus, the presence or absence of a storage device may be determined based on the high and/or low frequency components of the detected image.

Furthermore, the exemplary sensor does not require additional sensors or components to determine the presence or absence of a storage cartridge separate from the sensor and components used to read the barcode label. For example, an exemplary gripper mechanism included in a library system does not necessarily require a barcode scanner and an additional storage cartridge sensor, such as a mechanical sensor, optical sensor, or the like to determine the presence or absence of a storage device.

The examples described herein are generally described as a magnetic tape library including multiple magnetic tape cartridges. It should be understood, however, that the various embodiments are contemplated for use with other types of storage media devices and storage media libraries. For example, a storage library may include optical media devices alone or in combination with magnetic media storage devices and the like.

Figure 1:
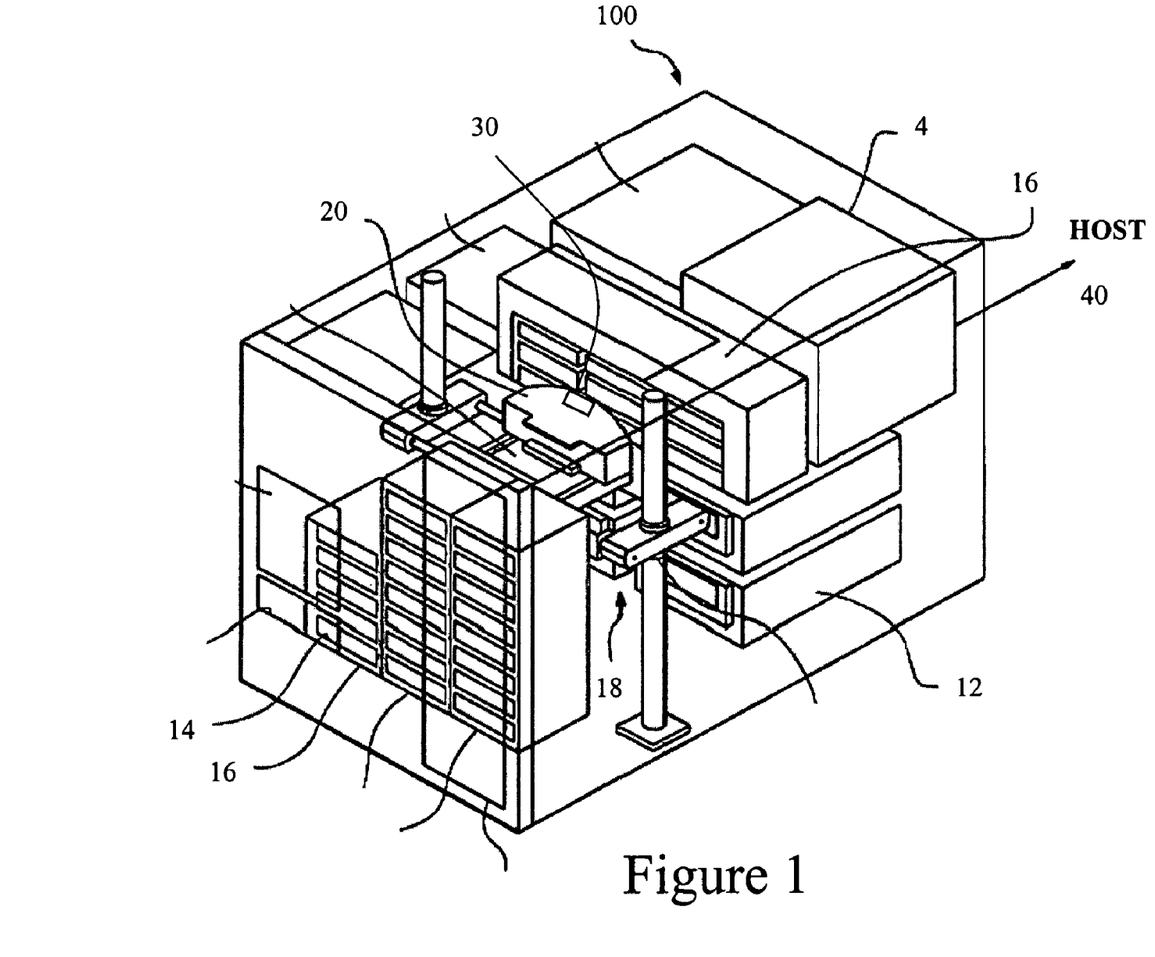
FIG. 1 illustrates an exemplary automated tape library system having a transport mechanism.

FIG. 1 illustrates an exemplary automated storage library system 100 for the storage and retrieval of a plurality of tape cartridges 14. Storage library system 100 may be used with the systems and methods described below with reference to FIGS. 2–6. The library system 100 is presented merely as an exemplary library system useful with the methods and systems described herein, and various other library systems and configurations may be used. It should also be understood that the various examples are contemplated for use with other types of storage media devices and storage media libraries useful for storing data. For example, a storage library may include various storage devices such as magnetic disks, optical storage devices, and the like alone or in combination with other data storage devices.

Storage library system 100 includes one or more tape drives 12, a plurality of storage cartridges 14 stored in bins or storage slots 16, and a robotic arm 18 equipped with a gripper mechanism 20 for transporting selected cartridges 14. Within automated tape library system 100, robotics, including robotic arm 18 and gripper 20 transport tape cartridges 14 between storage slots 16 and tape drives 12. Tape drives 12 are controlled by library controller 4, which is in communication with a host computer or network system (not shown). In one example, cartridges 14 include Super DLTape™ cartridges, and drives 12 include SDLT 320™ magnetic tape drives both sold by Quantum Corporation. It should be clear, however, that any type of removable data storage medium and any type of data media drive or data transfer device useful for such a storage medium may be used within storage library 100.

Typically, an inventory of cartridges 14 is performed to identify and catalogue the contents of cartridges 14 within the library system 100 as well as determine capacity in terms of empty storage bins 16 and cartridges 14. To perform an inventory, the library system 100 further includes a sensor 30 associated with the gripper mechanism 20 that may identify a barcode label or other suitable identifying indicia associated with a cartridge 14. Sensor 30 may include a linear scanner or an area sensor. To increase the speed and/or accuracy of the inventory process, sensor 30 may also be used alone or in combination with barcode reading to distinguish and identify the presence or absence of an unlabeled cartridge 14, e.g., an occupied or empty storage slot 16. In addition to barcode labels, a linear scanner or the like may also be used for Optical Character Recognition (OCR) of human readable labels and the like.

In one example, sensor 30 includes a linear scanner as described in greater detail below. Sensor 30 may be mounted on the gripper mechanism 20 or the robotic arm 18 in any suitable manner. In one example, sensor 30 is located adjacent the gripper mechanism 20 such that as the gripper mechanism 20 is in position to take-up a cartridge 14 the sensor 30 may read a barcode label and/or detect the presence of a cartridge 14. Alternatively, the sensor 30 could be located on any convenient location on the gripper mechanism 20 or robotic arm 18 and moved to a desired distance from the opening of a slot 16 for reading barcode labels and detecting the presence of cartridges 14.

The library system 100 further includes a library controller 4 for coordinating movements and actions of drives 12, robotic arm 18, gripper mechanism 20, sensor 30, and the like. Alternatively, a separate robotics controller and a library system controller may be included. A general library controller 4, robotics controller, or library controller may include any programmable general purpose computer or processor and preferably will have a suitably programmed microprocessor or microcontroller. The input-output connections between the library controller and various other components of the library system 100 may include well-known industry standard cabling and communication protocols. For example, Ethernet, Inter Integrated Circuit bus (I2C), Small Computer System Interface (SCSI), ultra-wide SCSI, fast SCSI, fibre channel, and the like.

Library controller 4 operates to coordinate movements and actions of media drives 12, robotic arm 18, and the like. Library controller 4 may include a suitable processor as described above and is typically interconnected with a host processor, which sends access commands to controller 4. In one example, information recorded to or read from one or more of the cartridges 14 is transmitted between one of the drives 12 to the host or a storage area network through a second data path connection, e.g., a fibre channel bridge or the like.

Automated tape library system 100 may further include various other features such as a calibration camera, load ports for manually adding and removing cartridges to and from the library, various access doors, control panels, and the like as known in the art. For illustrative purposes, however, such additional features have been omitted from the description.

Figure 2A:
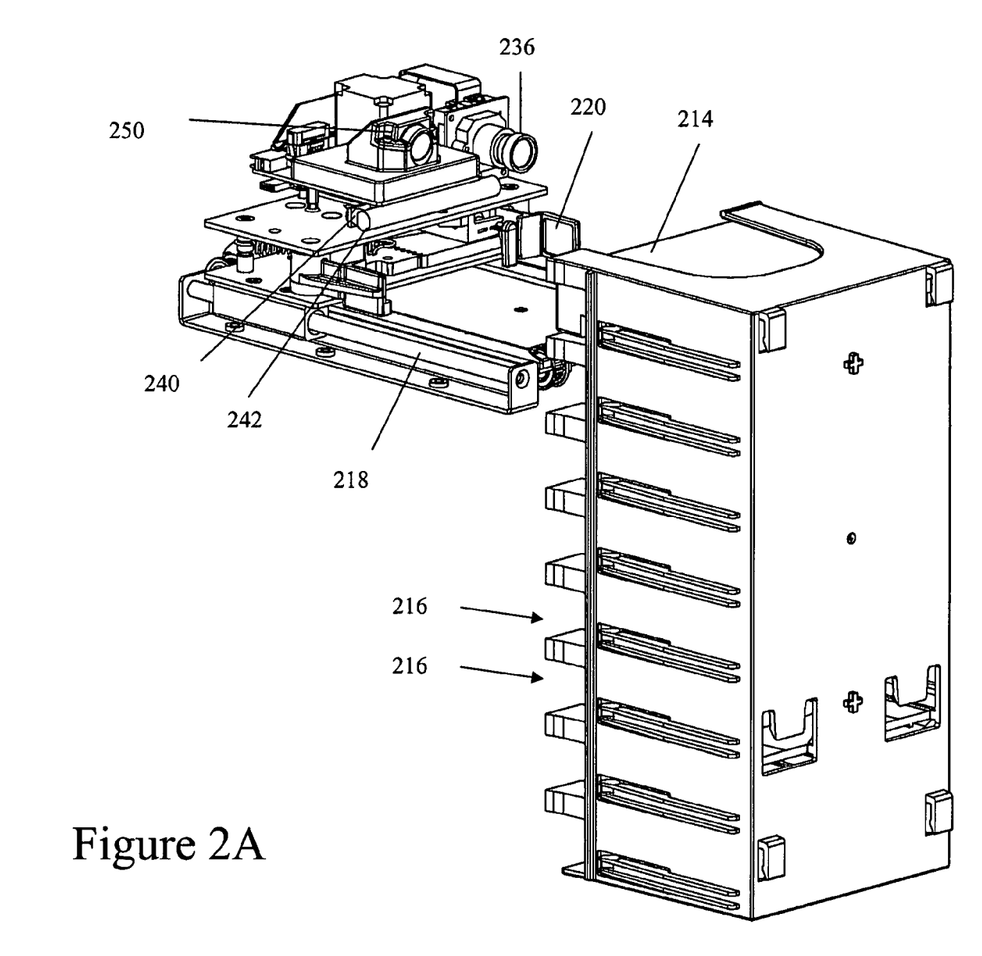
FIGS. 2A and 2B illustrate perspective views of an exemplary gripper assembly adjacent to a column of storage slots.
Figure 2B:
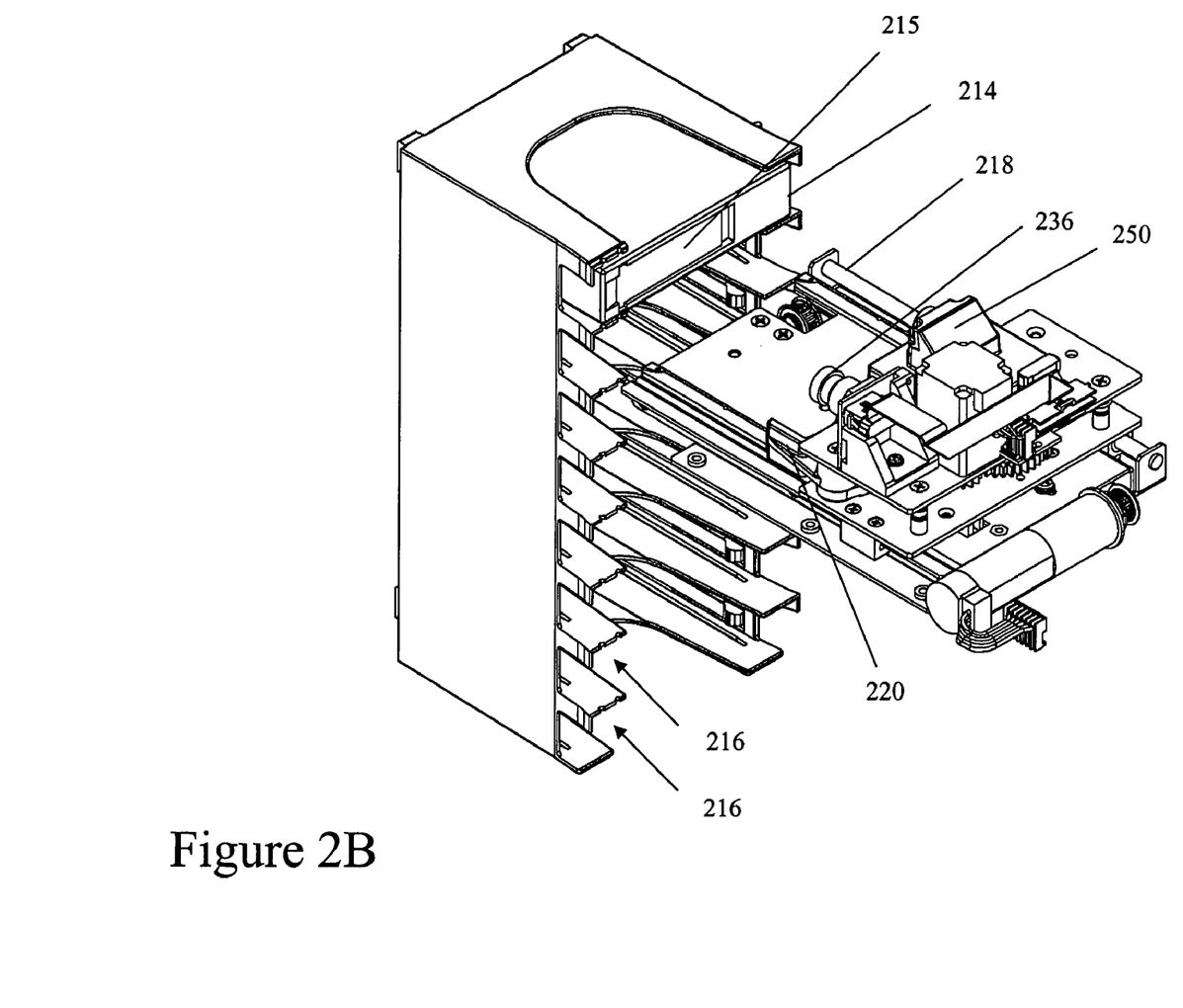

FIGS. 2A and 2B illustrate an exemplary gripper mechanism 220 and linear scanner 250 positioned adjacent to a column of storage slots 216 including cartridge 214. A library may include any number of storage slots 216 arranged in various manners. For example, storage slots 216 may be angled down from a front opening to the back to more securely hold cartridges 214. Typically, multiple columns of storage slots 216 are arranged along an interior cabinet that may be, for example, rectangular or cylindrical in shape. The configuration of gripper mechanism 220, linear scanner 250, or the like may influence the shape and orientation of the storage slots 216. In one example, storage slots 216 may be angled down from a front opening to the back to more securely hold cartridges 214.

Cartridge 214 may include a unique identifying barcode label 215 positioned generally on the front surface of the cartridge, i.e., the side which faces out of the storage slot and opposite gripper 220 when cartridge 214 is stored therein. The bar code label 215 indicates to the system controller or host processor (not shown) the identity of the cartridge 214. For example, the bar code label 215 may indicate that cartridge 214 is available to be written on and the like.

In an inventory process of a storage library system it is generally desirable to identify the cartridges 214 contained within the library and slots 216 available for additional cartridges 214 to be stored. This is generally done by moving linear scanner 250, which may be attached to either gripper 220 or a portion of robotic arm mechanism 218, to a position adjacent each storage slot 216 and imaging the barcode label 215 on each cartridge 214. A calibration camera 236 or the like may also be included for determining the position of storage slots 216. If a barcode label is not detected at a particular storage slot 216 it is desirable to know whether the storage slot contains an unlabeled cartridge 214 or is empty of a cartridge 214.

In operation, light source 240 illuminates the front surface of cartridge 214 and linear scanner 250 images in the vicinity of the front face of cartridge 214. Optics included in linear scanner 250 may create a depth of focus approximately where barcode label 215 is expected to be located. If a cartridge 214 with a barcode label 215 is present, linear scanner 250 may image and read the barcode label 215 accordingly. If a cartridge 214 is not present in storage slot 216, the light will reflect off the back features of storage slot 216. The back features of storage slot 216 will be detected out of focus, and linear scanner 250 will detect and image relatively low frequency features. If an unlabeled cartridge 214 is present in storage slot 216, the light will reflect off cartridge 214 near the focal point of the optics, and linear scanner 250 will detect and image relatively high frequency features. The relative magnitude of frequencies output by linear scanner 250 may be used determine the presence or absence of a cartridge 214.

Figure 3:
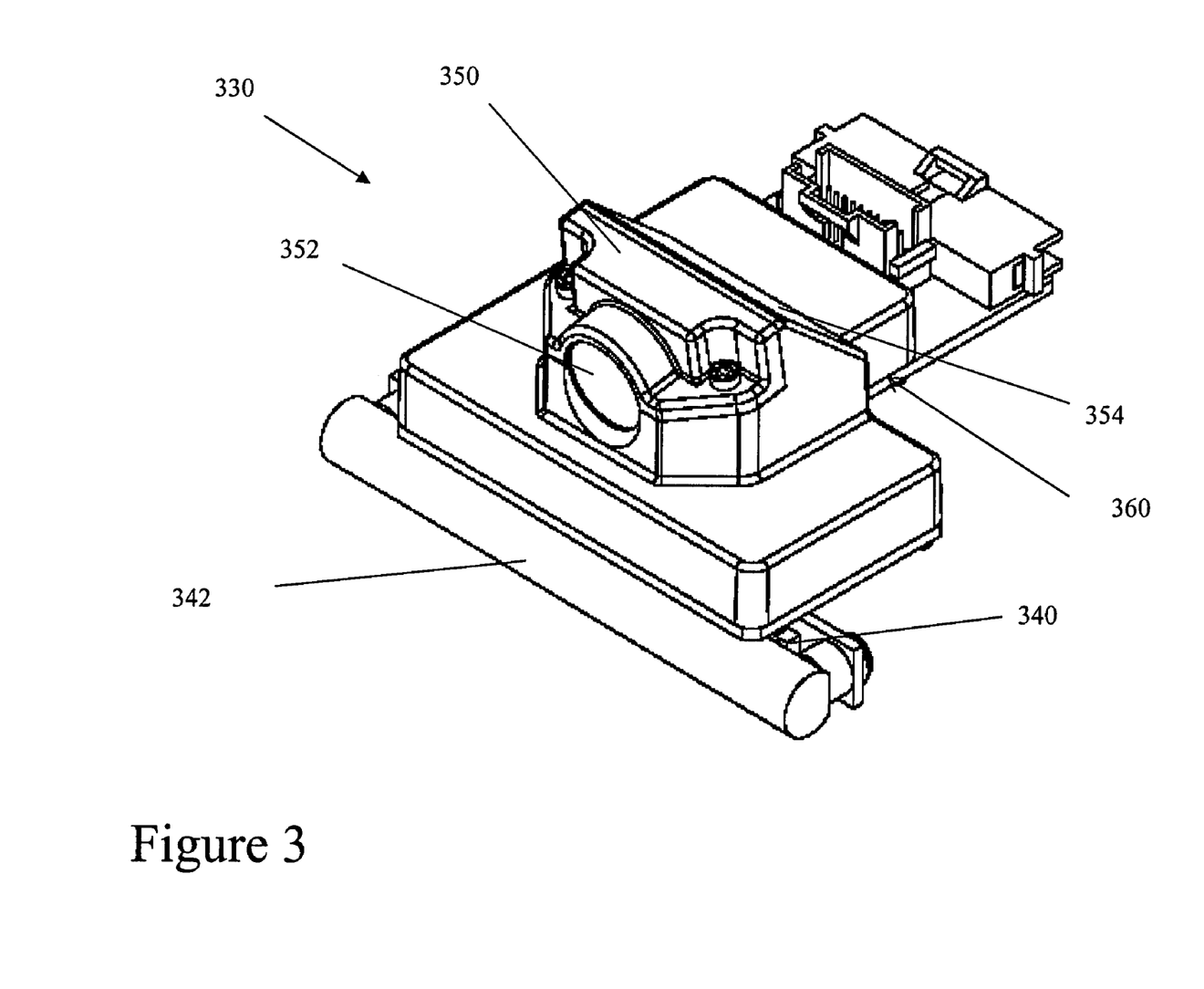
FIG. 3 illustrates an exemplary sensor.

A more detailed view of an exemplary sensor 330 including linear scanner 350 for reading barcode labels and/or detecting the presence of cartridges is illustrated in FIG. 3, which may be referred to in conjunction with FIGS. 2A and 2B. Sensor 330 includes a light source 340, for example, a row of light emitting diodes ("LEDs"). Light source 340 preferably includes two or more LEDs in a linear arrangement, but any number of individual light sources and/or different arrangements are contemplated. Light source 340 does not necessarily need to produce visible light and may operate, for example, to produce infrared light, ultraviolet light, or the like. Other exemplary light sources include incandescent, fluorescent, and xenon flash light sources.

In this example, linear scanner 350 is positioned above light source 340, but various other configurations are possible and contemplated. A lens 342 is positioned relative to light source 340 to focus light emitted from light source 340 and produce a focused line of light suitable for detecting a barcode label. In one example, lens 342 is a poly-carbonite cylindrical rod positioned adjacent light source 340 to capture and focus light from light source 340 and focus light across the expected position of a barcode label suitable for linear scanner 350 to detect and read the barcode label. Other materials such as glass, quartz, and like may be used. Further, other shaped lenses, optical elements, light source configurations, and the like may be used depending on the particular application. Additionally, a lens or optical element may be omitted in other examples.

Linear scanner 350 is operable with optical source 340 to detect bar code labels as well as detect the presence or absence of a cartridge within a storage slot. Linear scanner 350 generally receives light from light source 340 that is reflected from the barcode label, cartridge, storage slot, and the like. Linear scanner 350 includes a lens 352 to project and/or focus light reflected from the pattern to be read by the camera onto a linear scanner chip 360, e.g., a charge coupled device (CCD), located at the base of linear scanner 350. In one example, lens 352 and/or additional optics included in linear scanner 350 provide a depth of focus approximately plus/minus 0.5 to 1.0 inches from the expected distance of the barcode label from the linear scanner during operation.

For example, if the expected distance of the barcode label from the camera during operation is approximately 4 inches, the depth of focus is desirably between approximately 3 and 5 inches. The relatively narrow depth of focus allows objects that are too close or too far away from the expected distance to appear out of focus in the detected image. As discussed in greater detail below, the out of focus objects will be output or imaged by linear scanner 350 as low frequency analog data relative to objects that are in focus enabling a distinction between an unlabeled cartridge and an empty storage slot.

Linear scanner chip 360 may include a linear photosensitive chip with a horizontal slit therein that detects incident light. A processor may determine an image of the barcode label from the incident light on chip 360 and identify the barcode label or the presence/absence of a cartridge. In one example, the linear scanner chip 360 includes a 2048 linear pixel array such as the TCD1209D CCD linear Image Sensor chip manufactured by Toshiba Corporation. It should be recognized, however, other linear image sensors suitable for barcode reading are contemplated. Further, in another example, an area sensor, e.g., a CMOS 664 by 664 pixel array, may be included. An area sensor may operate similar to the examples described with a linear scanner having a linear pixel array by analyzing data along one or more linear scans or linear arrays within the area sensor. In one example, a single area sensor could determine the presence or absence of cartridges, read barcode labels, and perform image based calibration processes based on a suitable fiducial mark in the library system. In addition to detecting a cartridge and reading a barcode label, an area sensor (or multiple scans of a linear scanner) could be used to calibrate the gripper mechanism within the library system. Therefore, although linear sensor 330 has been described as including linear scanner 350, those of ordinary skill in the art will recognized that a suitable area scanner may also be used in the examples described.

The linear scanner chip 360 allows for faster read times of barcode labels than mechanical laser scanner assemblies. The faster scan or read rate decreases inventory time. Further, multiple scans may be made for each barcode label thereby improving the accuracy of the inventory as well as the speed. For example, the linear scanner may scan at rates between 50 and 295 inches per second and make 7 passes per barcode label to increase accuracy.

The linear scanner 350 may further include various mirrors and lenses to project and focus the image to linear scanner chip 360 depending on the application and design of the linear scanner 350. In this example, a mirror 354 is used to redirect the image towards the base of linear scanner 350 where linear scanner chip 360 is located to reduce the profile of sensor 330. It should be further recognized that the linear scanner 350 and gripper mechanism (see FIG. 2A) may be in various configurations depending on the particular application and design considerations. For example, linear scanner 350 may be located below, horizontally adjacent to, or angled with respect to the gripper mechanism.

Figure 4A:
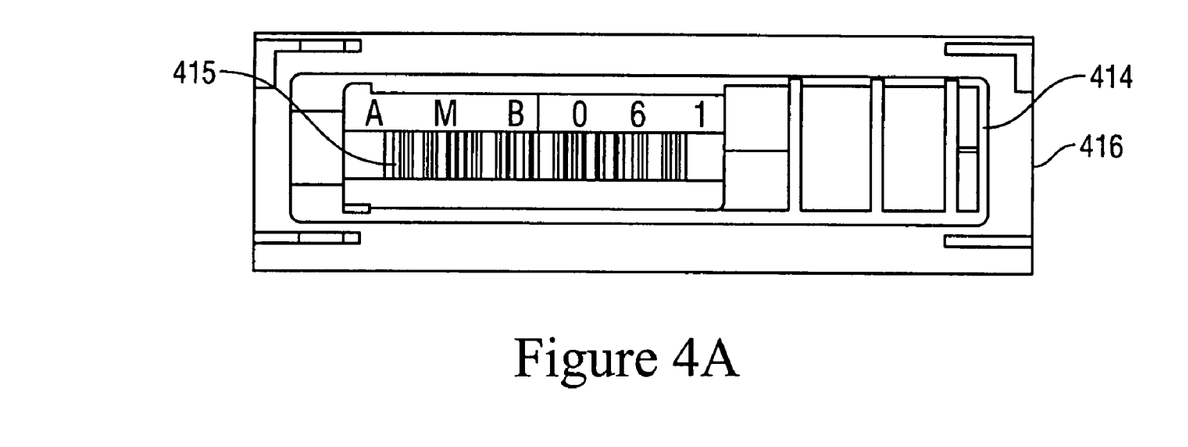
FIGS. 4A, 4B, and 4C illustrate exemplary storage slots including a labeled tape cartridge, an unlabeled tape cartridge, and an absence of a tape cartridge respectively.
Figure 4B:
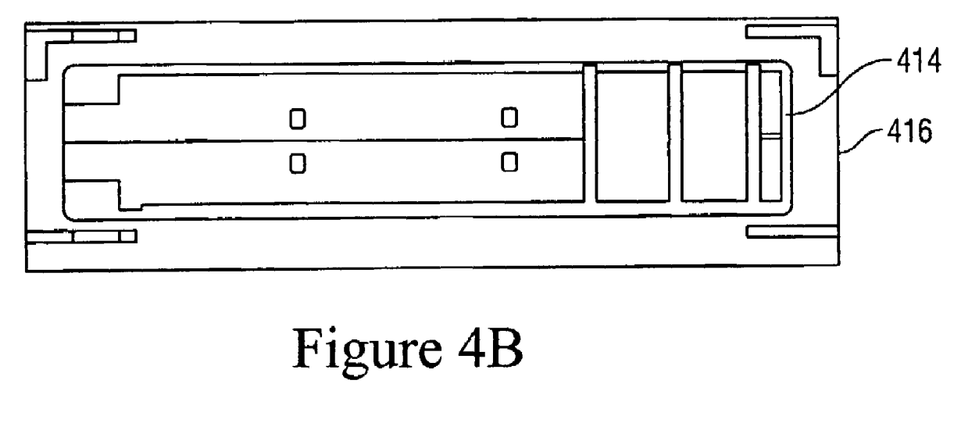
Figure 4C:
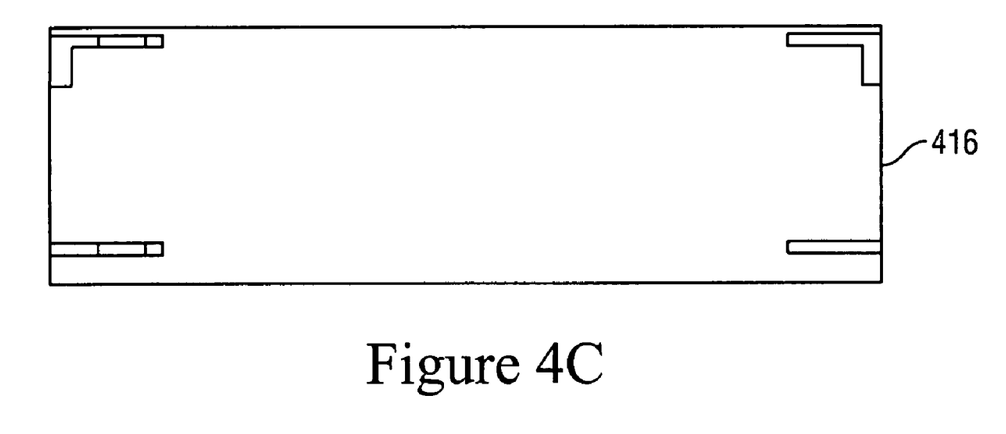
Figure 5A:
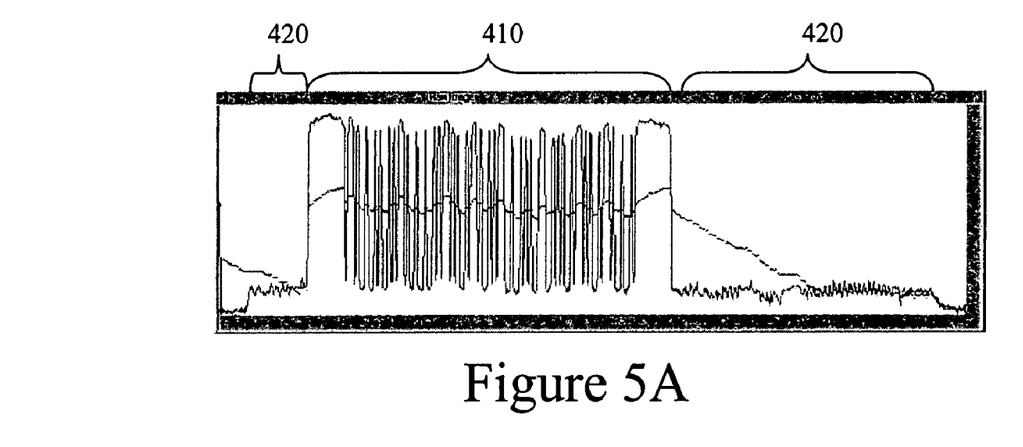
FIGS. 5A, 5B, and 5C illustrate exemplary graphs of light intensity from a linear scan of a labeled tape cartridge, an unlabeled tape cartridge, and an empty storage slot respectively.
Figure 5B:
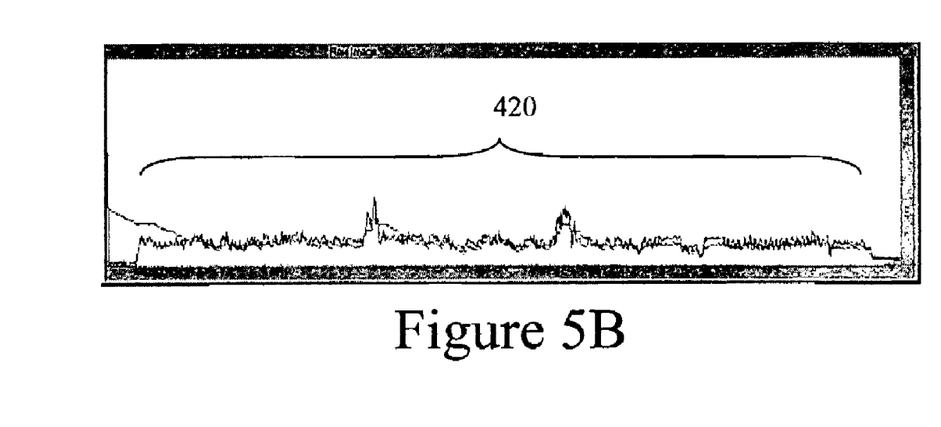
Figure 5C:
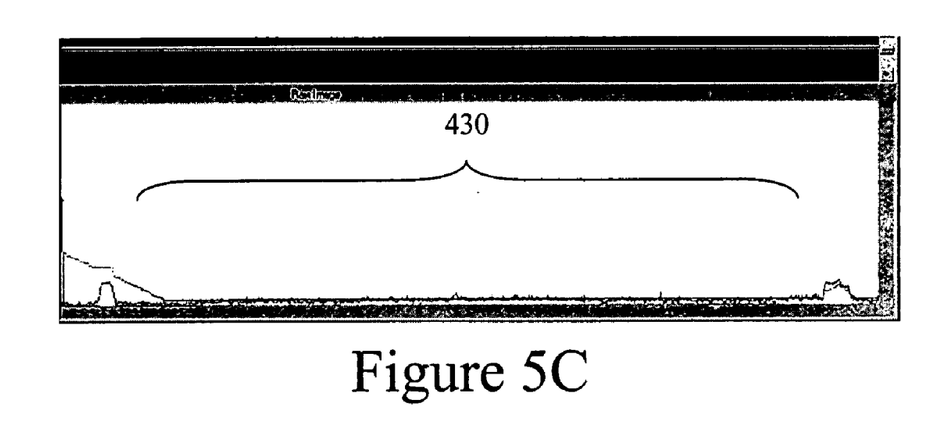

FIGS. 4A, 4B, and 4C illustrate an exemplary labeled cartridge, an unlabeled cartridge, and the absence of a cartridge within a storage slot respectively. FIGS. 5A, 5B, and 5C illustrate exemplary images of the output of a linear scan across the face of the storage slots of the image of FIGS. 4A, 4B, and 4C.

With reference to FIG. 4A, a cartridge 414 is illustrated within storage slot 416 and includes a barcode label 415 affixed thereto. FIG. 5A illustrates the relative light amplitude detected by pixels of a linear scan across the face of the cartridge 414. The detected light includes large amplitude differences across the face of the barcode label 415 corresponding generally to the dark and light portions of the barcode label as indicated by bracket 410. Low amplitude but high frequency data imaged from the portion of cartridge 414 without barcode label 415 is indicated by brackets 420, with relatively low frequency data outside of cartridge 414, i.e., outside of brackets 410 and 420 where objects are out of focus. The large amplitude differences indicated by bracket 410 may be analyzed, for example, with firmware commands or the like to decode the barcode label as is known in the art. In one example, a system includes both a library controller and robotics controller, where the robotics controller includes the functionality to analyze sensor output and determine low or high frequency components and features. Other systems may include a single controller, multiple micro-controllers, or even pure logic to carry out these functions.

FIG. 4B illustrates a cartridge 414 within storage slot 416 without a barcode label affixed thereto. FIG. 5B illustrates the relative light amplitude detected by pixels of a linear scan across the face of the cartridge 414. The detected light in this instance does not include the large amplitude differences across the face of the cartridge 414 corresponding to dark and light portions of a barcode label as seen in FIG. 5A, but does include relatively sharp, high frequency component peaks across the face of the cartridge 414 as indicated by bracket 420 compared to frequencies outside of cartridge 414. The relatively high frequency components are also shown in the right portion of FIG. 5A corresponding to the location of the face of the cartridge 414 not including the barcode label 415. The high frequency components fall off at the edges of the face of cartridge 414 where objects imaged, for example, back portions of the slot 416, are out of focus.

FIG. 4C illustrates a storage slot 416 without a cartridge 414, and FIG. 5C illustrates the relative light amplitude detected by pixels of a linear scan across storage slot 416. The image in this instance does not include the large amplitude differences across the face of the barcode label 415 corresponding to dark and light portions of the barcode, or the sharp, high frequency component peaks across the cartridge shown in FIGS. 5A and 5B. The smoothness, or relatively low frequency components in the middle section of the graph indicated by bracket 430 is due, at least in part, that the image of the deeper portions of storage slot 416 are detected out of focus and therefore include relatively low frequency data components. By measuring the relative frequency of the analog data imaged by a linear scanner, e.g., between cases in FIGS. 5B and 5C, the presence or absence of a cartridge may be determined.

Figure 6:
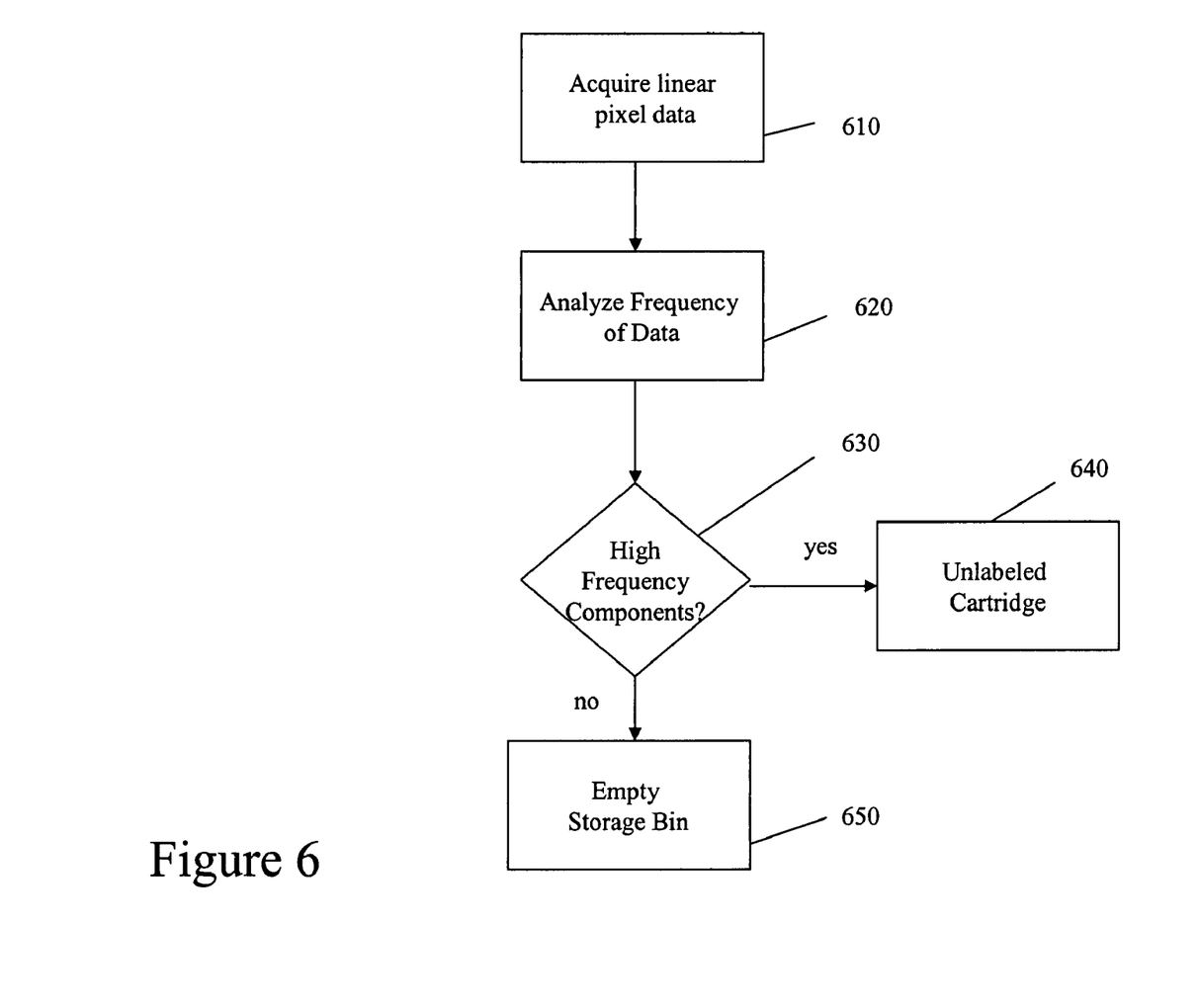
FIG. 6 illustrates an exemplary method for determining the presence or absence of an unlabeled tape cartridge.

FIG. 6 illustrates an exemplary method for determining the presence or absence of a cartridge in a storage bin. The exemplary method may be implemented through firmware commands or the like. In one exemplary method for determining the presence of an unlabeled cartridge, firmware commands are used to analyze the analog output from an electronically scanned linear CCD scanner or from a portion of a CMOS area sensor and distinguish between an empty storage bin and a cartridge without a barcode label. In block 610, the linear scanner is placed adjacent to a storage slot and linear pixel data is acquired by imaging a location where the cartridge and barcode label are expected to be located. For example, the camera and optics may be configured to have a depth of focus located approximately where an opposing surface of the cartridge having the barcode label is expected to be found.

In one example, data from the linear scanner is first digitized. The linear pixel data from a 2048 linear pixel array may include 8 bits of intensity information per pixel, where the brighter the intensity the higher the number, i.e., 8 bit unsigned integer. The digitized data may then be suitably converted to element widths and converted to barcode data as is known in the art. If barcode data is retrieved from the image it may be assumed that a cartridge is present.

If the acquired data does not indicate the presence of a barcode label the frequency of the analog data may be analyzed in block 620 to determine if the storage bin is empty or rather includes an unlabeled cartridge. In particular, the frequency of at least a portion of the image may be analyzed, for example, near the middle of the scanned image. In block 630 a predetermined threshold value is used to determine high frequency data and low frequency data, e.g., if the frequency is above the threshold and considered high frequency data the system determines that a cartridge is present in block 640. If the frequency is below the threshold and considered low frequency data the system determines that a cartridge is not present in block 650. The threshold value may depend, at least in part, on factors such as the optical source, optical elements, detector array, the frequency signature of unlabeled cartridges, and the like.

It should be recognized by those skilled in the art that the method described in FIG. 6 may include various other methods not explicitly described. Further, the order in which the method was described is illustrative only. For example, a determination of high or low frequency output data and thus the presence of a cartridge, may be made prior to decoding bar code labels or after an unsuccessful decode of a barcode label has been performed. The process may also be performed in parallel depending on the particular application.

The above detailed description is provided to illustrate exemplary embodiments and is not intended to be limiting. It will be apparent to those skilled in the art that numerous modification and variations within the scope of the present invention are possible.

The invention claimed is:

1. A storage device detector system for use with a gripper assembly in a storage library system, comprising:
    a light source for directing light to an expected position of a storage device;
    a sensor for detecting light; and
    at least one controller, wherein the at least one controller and the sensor are configured to detect light reflected from the expected position of the storage device and determine the presence of the storage device based on frequency components of at least a portion of a signal associated with a linear scan by the sensor exceeding a threshold, wherein the frequency components vary with a distance of the sensor from a reflecting surface.

2. The system of claim 1, wherein the sensor includes a linear scanner.

3. The system of claim 1, wherein the sensor includes an area sensor.

4. The system of claim 1, wherein the at least one controller and sensor are further configured to detect a barcode label associated with a storage device based on the detected light.

5. The system of claim 1, wherein if no portion of the frequency components exceed the threshold, determining that a storage device is not present.

6. The system of claim 1, wherein the sensor has a depth of focus located approximately at the expected position of a face of the storage device.

7. The system of claim 6, wherein the depth of focus is within plus or minus 1.0 inch from the expected position of a face of the storage device.

8. The system of claim 1, wherein the light source includes a plurality of light emitting diodes.

9. The system of claim 1, wherein the storage device includes a magnetic tape cartridge.

10. A storage library system having a storage device detector system, comprising:
    a light source for directing light to the expected position of a storage device;
    a linear scanner; and
    at least one controller, wherein the at least one controller and linear scanner are configured to
    detect light reflected from the expected position of the storage device and determine the presence of a storage device based on at least a portion of frequency components of an output from the linear scanner exceeding a threshold, wherein the frequency components vary with a distance of the sensor from a reflecting surface, and
    determine the presence of a label associated with the storage device.

11. The system of claim 10, wherein if no portion of the frequency components exceed the threshold, determining that a storage device is not present.

12. The system of claim 10, wherein the linear scanner includes a linear CCD scanner.

13. The system of claim 10, wherein the linear scanner has a depth of focus located approximately at the expected position of the opposing face of the storage device.

14. The system of claim 13, wherein the depth of focus is within plus or minus 1.0 inch from the expected position of the opposing face of the storage device.

15. The system of claim 10, wherein the light source includes a plurality of light emitting diodes.

16. The system of claim 10, wherein the storage devices include magnetic tape cartridges.

17. A method for determining the presence of a storage device in an automated storage library system, comprising:
    directing light to a storage slot for holding a storage device;
    detecting light reflected from the storage slot with a sensor; and
    determining if a storage device is within the storage slot based on at least a portion of frequency components from an output signal of the sensor associated with a linear scan by the sensor exceeding a threshold, wherein the freciuency components vary with a distance of the sensor from a reflecting surface.

18. The method of claim 17, wherein the sensor includes a linear scanner.

19. The method of claim 17, wherein the sensor includes an area scanner.

20. The method of claim 17, further including reading a barcode label associated with the storage device with the sensor.

21. The method of claim 17, further including determining that a storage device is not present if no portion of the frequency components exceed the threshold.

22. The method of claim 17, wherein the sensor has a depth of focus at a location approximately where an opposing surface of the storage medium is expected to be located.

23. The method of claim 17, wherein the depth of focus is within plus or minus 1.0 inch from the expected position of the opposing face of the storage device.

24. A method for determining the presence of a storage device in an automated storage library system, comprising:
   directing light to a storage slot for holding a storage device;
   detecting light reflected from the storage slot with a sensor;
   determining if a storage device is located within the storage slot based on at least a portion of frequency components of analog data associated with a linear scan by the sensor exceeding a threshold, wherein the frequency components vary with a distance of the sensor from a reflecting surface; and
   reading a barcode label associated with the storage device based on the light detected by the sensor.

25. The method of claim 24, further including determining that a storage device is not present if no portion of the frequency components of the detected image exceed the threshold.

26. The method of claim 24, detecting the light with a camera having a depth of focus approximately at the expected position of the opposing surface of the storage device.

27. The method of claim 26, wherein the depth of focus is within plus or minus 1.0 inch from the expected position of the opposing face of the storage device.

28. The method of claim 24, wherein the sensor includes a linear scanner.

29. The method of claim 24, wherein the sensor includes an area scanner.

* * * * *